July 14, 1925.  1,546,303

G. MENIER

AUTOMATIC LUBRICATING DEVICE FOR BOLTS AND LATCHES

Filed April 14, 1924

Inventor
G. Menier
by Langner, Perry, Card & Langner
Att'ys.

Patented July 14, 1925.

1,546,303

UNITED STATES PATENT OFFICE.

GASTON MENIER, OF PARIS, FRANCE.

AUTOMATIC LUBRICATING DEVICE FOR BOLTS AND LATCHES.

Application filed April 14, 1924. Serial No. 706,595.

*To all whom it may concern:*

Be it known that I, GASTON MENIER, a citizen of the French Republic, residing at Paris, France, 56 Rue de Chateaudun, have invented certain new and useful Improvements in Automatic Lubricating Devices for Bolts and Latches, of which the following is a specification.

This invention relates to an improvement in or modification of the automatic lubricating devices for locks and bolts as claimed in the specification of Letters Patent No. 1,265,351.

The automatic lubricating devices for locks and bolts described in the specification of Patent No. 1,265,351 necessitate the provision of holes either in the catch plate or in the door frame, to which the latter is attached, in order to enable the said lubricating devices to be mounted in position. In an improvement in such lubricating devices it has been suggested to provide a particular shape of bolt or catch in which is provided a lubricating cup closed by a pad of suitable material.

The present invention has for its subject an improvement enabling the automatic lubricating device to be applied to any type of lock, for which purpose it is unnecessary to modify the bolt or catch or the catch plate in any respect, the setting of the lubricating device being effected by hand without the use of tools.

One of the essential features of the present invention resides in the use of a resilient member, provided with a material capable of retaining a lubricating substance, adapted to form the lubricating device, the said member being held in the interior of the catch plate between two opposite walls of the latter, by means of its resiliency. The member may be formed either of a metal wire, which is twisted or not, which serves to support textile fibres, or of a woven cylinder, more or less rigid, with a resilient inner portion, or by any other similar device of suitable resiliency and capable of supporting the greasy substance adapted to effect the lubrication of the catch or bolt.

In the accompanying drawing are illustrated diagrammatically by way of example two forms of construction of the invention.

Figure 1:
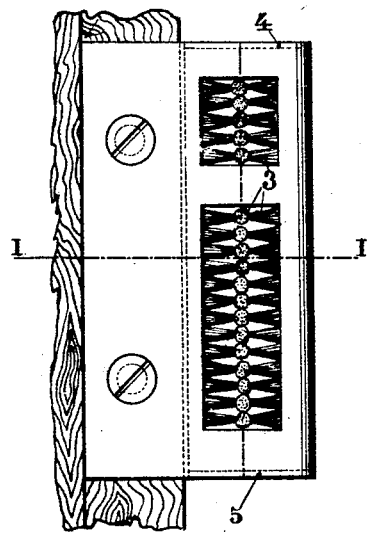
Figure 1 is an elevation of a catch plate provided with a lubricating device.

In the drawings and in the description of the invention which follows it is assumed, for the sake of clearness, that the lubricating device consists of a support formed of two metal wires 1 and 2 which are twisted together and support threads 3 of linen or cotton (or strips of linen, cotton, felt or the like). It will however be understood that the invention is not limited to this particular form of construction and that the lubricating device may be constructed in any other suitable manner as hereinbefore set out.

Thus for example it is possible to use a twisted wick of linen or cotton with a metal interior forming a spring. The lubricating device may be flat, or of circular, triangular, or other suitable cross section. It may be formed by a metal wire coiled in the form of a helix and supporting the material soaked in a greasy substance.

Figure 2:
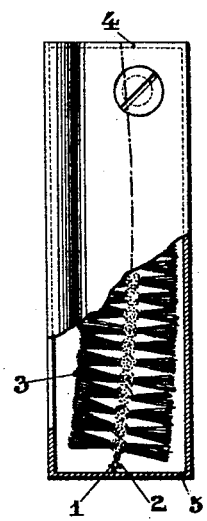
Figure 2 is a front view of the same catch plate partly broken away.
Figure 3:
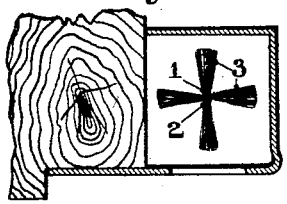
Figure 3 is a horizontal section on the line I—I of Figure 1.

In the example illustrated in Figures 1 to 3 the lubricating device is held by its own resiliency between the top 4 and the bottom 5 of the catch plate. For this purpose the lubricating device is cut to a length slightly larger than the distance between the two walls 4 and 5. The lubricating device is inserted into the catch plate through a hole in the latter by being slightly bent. It is then released and will take up its position by reason of its springiness and will thus be held between the top and bottom of the catch plate. Care must of course be taken that the lubricating device has an external diameter somewhat less than the internal dimensions of the catch plate. It can then move in the interior of the catch plate so as to yield when the bolt or catch engages with the latter when the door is closed and by reason of its springiness it will return to its normal position when the door is opened. It will be seen that if the lubricating device is soaked in any suitable lubricating substance, the bolt or catch will contact therewith whenever the door is closed so that the bolt or catch will thus be lubricated and its beveled portion will retain a thin layer of lubricating material which suffices to ensure the easy closing of the door.

Figure 5:
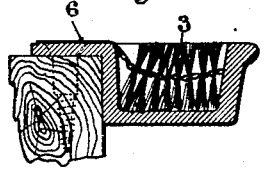
Figure 5 is a section on the line II—II of Figure 4.
Figure 6:
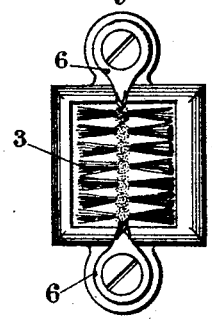
Figure 6 is a view similar to Figure 4 showing the application of the invention to another type of open catch plate.
Figure 4:
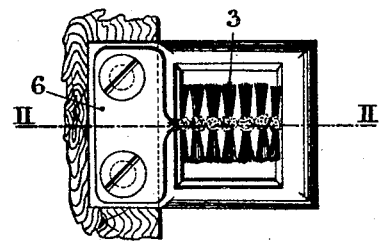
Figure 4 shows a modification of the invention applied to an open catch plate, the catch plate being shown in elevation.

When the invention is applied to a catch plate which is not provided with flanges, such as for example two open catch plates, the lubricating device cannot be retained in position by its own springiness between the opposite walls of the catch plate. In such a case the lubricating device is extended to one side (when the catch plate is provided with a single fixing plate as shown in Figures 4 and 5), or at both ends (when the catch plate has two fixing plates as shown in Figure 6) by means of a thin metal plate 6 provided with holes of which the diameter and position corresponds with that of the holes in the fixing plate of the catch plate. The lubricating device will thus be held in position by the same screws by which the catch plate is secured and it is thus possible to mount it in position without modifying the catch plate itself. In such arrangements the lubricating device, instead of being substantially straight as shown in the example of Figures 1 to 3, is preferably suitably bent towards the interior of the catch plate.

Having thus described my invention what I claim as new and desire to secure by Letters Patent is:—

1. An automatic lubricating device for lock bolts and the like, comprising, a resilient core, and lubricant absorbing material carried by the core.

2. An automatic lubricating device according to claim 1, said core being formed of twisted resilient wires, and said material being in the form of tufts held between the twists of the wires.

3. An automatic lubricating device according to claim 1, in combination with a catch plate, said core being slightly longer than one dimension of the notch plate with which used, the lubricating device being sprung into the catch plate, and resiliently held therein by the friction of its ends against opposite walls of the catch plate.

4. An automatic lubricating device according to claim 1, said core being formed of twisted resilient wires, and said material being in the form of tufts held between the twists of the wires, in combination with a catch plate, said core being slightly longer than one dimension of the catch plate with which used, the lubricating device being sprung into the catch plate, and resiliently held therein by the friction of its ends against opposite walls of the catch plate.

5. In a lubricating device, in combination, a catch plate, and a resilient lubricating member wholly separate from the catch plate and positioned within the same, the lubricating member being sprung into contact with walls of the catch plate, and held within the catch plate by friction.

In testimony whereof I have signed my name to this specification.

GASTON MENIER.